United States Patent [19]

Stegall et al.

[11] Patent Number: 4,834,879
[45] Date of Patent: * May 30, 1989

[54] TWO-STAGE WASTE WATER TREATMENT SYSTEM FOR SINGLE FAMILY RESIDENCES AND THE LIKE

[76] Inventors: William A. Stegall, 30921 La. Highway 16, Denham Springs, La. 70726; Marty E. Tittlebaum, 857 High Plains Ave., Baton Rouge, La. 70810

[*] Notice: The portion of the term of this patent subsequent to May 12, 2004 has been disclaimed.

[21] Appl. No.: 46,255

[22] Filed: May 4, 1987

Related U.S. Application Data

[63] Continuation-in-part of Ser. No. 715,648, Mar. 25, 1985, Pat. No. 4,664,795.

[51] Int. Cl.$^4$ .............................................. C02F 1/74
[52] U.S. Cl. ................................. 210/205; 210/220; 210/320; 210/532.2
[58] Field of Search .............. 210/320, 532.2, 201, 210/202, 205, 220

[56] References Cited

U.S. PATENT DOCUMENTS

| | | | |
|---|---|---|---|
| 2,987,186 | 6/1961 | Burgoon et al. | 210/532.2 X |
| 3,051,315 | 8/1962 | Boester | 210/532.2 X |
| 3,195,727 | 7/1965 | Kibbee | 210/320 X |
| 4,505,813 | 3/1985 | Graves | 210/532.2 X |
| 4,681,684 | 7/1987 | Maroschak et al. | 210/532.2 |

Primary Examiner—Tom Wyse
Attorney, Agent, or Firm—Pravel, Gambrell, Hewitt, Kimball & Krieger

[57] ABSTRACT

An apparatus for the treatment of wastewater from relatively small structures such as single family residences, dwellings and the like includes first and second vessels connected by a flow line, the first vessel including a wastewater inlet and the second vessel including an outlet for the discharge of clarified water. A transverse baffle divides the second vessel into aeration and clarifier sections, the clarifier section including a transversely mounted inclined plate which prevents the accumulation of solid material in the clarified section and redirects the solid material back into the aeration section. A multiple angle discharge piping arrangement prevents clarified liquid from discharging the apparatus until it has made at least two right angle turns before reaching the discharge piping of the unit. Within the aeration chamber, aeration produces a rolling flow which includes a flow component that is generally from top to bottom adjacent the baffle, discouraging the flow of solid material into the clarifier.

4 Claims, 1 Drawing Sheet

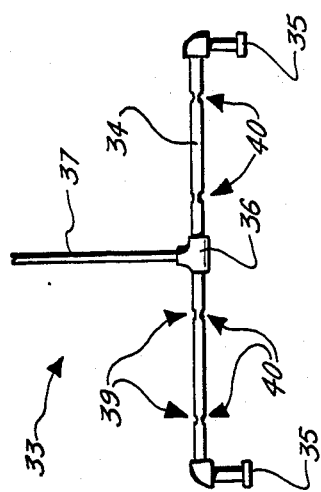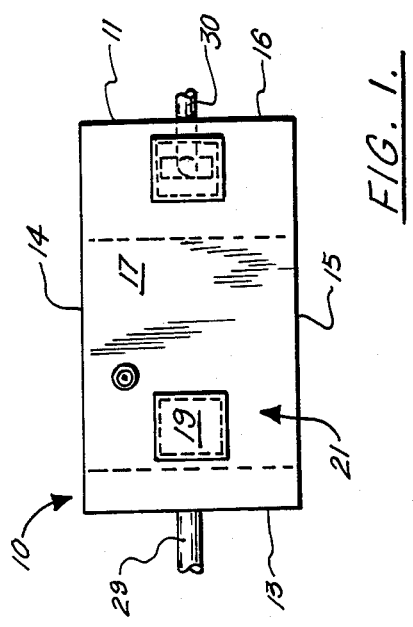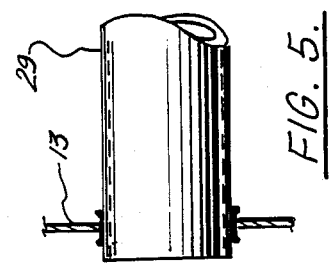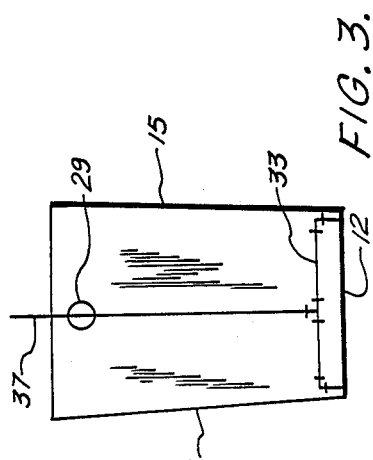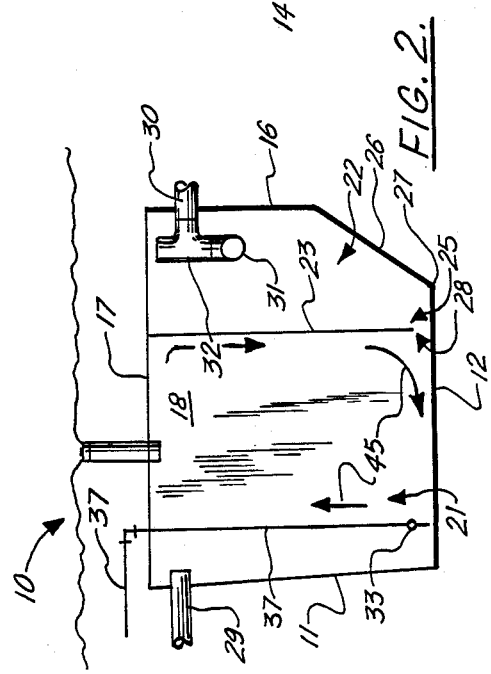

TWO-STAGE WASTE WATER TREATMENT SYSTEM FOR SINGLE FAMILY RESIDENCES AND THE LIKE

REFERENCE TO RELATED APPLICATION

This is a continuation-in-part patent application of U.S. Ser. No. 715,648 entitled "Two-Stage Waste Water Treatment System for Single Family Residences and the Like" filed Mar. 25, 1985, U.S. Pat. No. 4,664,795.

BACKGROUND OF THE INVENTION

The present invention relates to waste treatment systems and especially those waste treatment systems which are packaged, containerized units.

In the treatment of wastewater, there is often utilized a containerized or packaged unit treatment plant which treats received waste product on an intermittent flow basis such as from a home, small apartment structure, building or the like. In the home construction industry, for example, there is often utilized a buried, subsoil sewage treatment vessel or septic tank which can be used to preliminarily treat waste products. Such sewage treatment devices usually receive flow intermittently and must treat the intermittent flow to meet ecological and building standards. Oftentimes the unit is merely a holding or "septic" tank that removes settlable solid waste from the wastewater stream.

It is desirable that wastewater be treated in an economical way utilizing as little energy as possible and as few moving parts as possible while removing a high percentage of solid material from the wastewater stream and while lowering the chemical oxygen demand (COD) and bio-chemical oxygen demand (BOD) of the wastewater stream. It is desirable that a minimum of sludge removal would be required since sludge disposal presents an extra problem.

It would be desirable that a wastewater treatment apparatus produce a total homogenation of the fluids received from the waste stream in order that they be properly bio-degraded. Waste entering the unit would normally be heterogeneous in nature, containing solid waste material as well as some liquid wastewater.

In aerated treatment systems, a problem is faced in that a clogging of the aeration assembly which provides bubbles to the unit will cause a degeneration of the treatment process or in fact a total stoppage of air flow to the vessel, transferring the process from aerobic to anaerobic, thus removing most treatment capability. It would be desirable that the aeration unit or air diffuser be provided that minimizes or prevents clogging by solid material which may enter the unit.

SUMMARY OF THE INVENTION

The present invention provides a sealed wastewater treatment apparatus suitable for underground installation and providing low cost waste treatment for small dwellings such as single family residences and the like. The apparatus includes a fluid containing vessel having a fluid inlet disposed at the upper surface portion thereof and a fluid outlet disposed generally opposite the fluid inlet and also at the upper portion of the vessel.

In the preferred embodiment, one or more baffles extends above and below a defined water line of the vessel, each baffle terminating at the outer wall of the vessel and depending from the lid portion thereof. The bottom edge of the baffle and the bottom edge of the inclined plate are positioned very close together and the bottom edge of the baffle extends very near the bottom of the vessel. This combination creates flow under the baffle through a small cross-sectional area so that flow velocity is increased, preventing the accumulation of solid matter on the downstream side of the baffle which is non-aerated and calm, allowing any contained settleable solid matter to settle. A vertically standing baffle wall extends transversely across the vessel from one side wall portion to the opposite side wall portion thereof, terminating below the lid portion and above the bottom portion so that fluid must travel under the baffle in order to reach the fluid effluent discharge. An inclined plate is transversely positioned in the second vessel, terminating at a position adjacent the lower end portion of the baffle at the baffle opening. The inclined plane forms an acute angle of at least fifty three degrees (53°) from the horizontal with the bottom of the vessel to prevent the accumulation of solid material thereon. An exit flow line is disposed at the upper portion of the vessel on the downstream side of the baffle and adjacent the effluent discharge. The exit flow line provides multiple right angle turns for supernatent liquid that will be transmitted from the clarifier section of the vessel to the effluent line.

An aeration diffuser is positioned within the vessel, generally opposite the baffle and vertically under the influent line for producing a rolling flow within the vessel that includes a downward vertical flow component adjacent the upstream side of the baffle. This positioning enhances mechanical breakup of any solid matter contained in the flow line.

In the preferred embodiment, the exit piping includes a pair of right angle pipe ells which are connected together forming a vertical rise tube that connects perpendicularly with a generally horizontal effluent line.

In the preferred embodiment, the baffle divides the vessel into an upstream aeration chamber and a downstream clarifier chamber.

In the preferred embodiment, in order to produce a rolling flow as above-described, the aeration diffuser is positioned generally under the influent line.

BRIEF DESCRIPTION OF THE DRAWINGS

A better understanding of the invention can be had when the detailed description of a preferred embodiment set forth below is considered in conjunction with the drawings, in which:

FIG. 1 is a top view of the preferred embodiment of the apparatus of the present invention;

FIG. 2 is a side elevational cutaway view of the preferred embodiment of the apparatus of the present invention;

FIG. 3 is a sectional view taken along lines 3—3 of FIG. 1;

FIG. 4 is a detail fragmentary view of the air diffuser portion of the preferred embodiment of the apparatus of the present invention; and FIG. 5 is a fragmentary view illustrating the tank and influent line connection.

DETAILED DESCRIPTION OF A PREFERRED EMBODIMENT

The apparatus of the present invention designated generally by numeral 10 of the drawings includes a vessel 11 having a bottom 12 which is preferably rectangular and four upstanding vertical side walls 13–16 which are connected edge to edge. A lid 17 forms a sealed closure over the vessel 11 to define an interior 18 which can contain a fluid volume therein. Access hatches 19, 20 allow periodic inspection of the unit for purposes of repairing any problems and/or maintenance.

The interior 18 of vessel 11 includes a pair of separate chambers including a first aeration chamber 21 and a second or clarifier chamber 22. The aeration chamber 21 and clarifier 22 are defined by an upstanding vertical and transversely extending baffle 23 which is connected at 24 to lid 17. 25 in the drawings indicates the bottom of baffle 23 which is positioned near the bottom 12 of vessel 11 but does not touch the bottom. Baffle 23 forms a continuous seal and connection with side walls 14, 15 so that fluid can only flow from one end of vessel 11 to the other under baffle 23 and more particularly under the bottom edge 25 portion thereof.

Downstream of baffle 23 is an inclined wall 26 which is connected to the bottom 12 of vessel 11 and also to side wall 16. 27 indicates the bottom of inclined portion 26. An opening 28 defines a flow zone from aeration chamber 21 and into clarifier 22. Flow zone 28 thus is the relatively small area defined by bottom 25 of baffle 23, and by side walls 15, 16 and by the bottom 27 of inclined wall portion 26.

Wastewater enters vessel 11 interior 18 through inlet pipe 29 and clarified liquid exits vessel 11 interior through outlet pipe 30. A pair of right angle turns are provided by means of connected tees 31, 32.

Aeration chamber 21 contains a diffuser assembly 33 which is positioned generally under inlet 29 and at the very bottom of vessel 11 adjacent bottom 12. Diffuser assembly 33 includes a transverse pipe 34 which is attached to bottom 12 by means of two spaced apart feet 35. A tee 36 and air line 37 complete the assembly of diffuser 33. Air can thus be pumped through airline 37 using a common compressor, for example. Transverse pipe 34 includes a plurality of upper openings 39 and a plurality of lower openings 40 which can be correspondingly placed and vertically aligned as shown in the drawings. Thus, the air openings would not normally clog during operation.

By positioning the bottom inclined wall portion 26 adjacent the bottom 25 of baffle 23, a very small flow zone is produced. Also, the inclined wall 26 is inclined sufficiently so that solid material cannot collect upon it. A suitable inclination for wall 26 would be at least fifty-three degrees (53°) from the horizontal. Thus, any solid matter which might flow through flow opening 28 and into clarifier 22 will settle upon inclined wall 26 and slide downwardly until it reaches the bottom 27 of inclined portion 26. This places any solid material which might enter clarifier 22 back adjacent flow opening 28 so that turbulence created in aeration chamber 21 by aerator or diffuser assembly 33 can carry away such solid material, back into aeration chamber 21. Arrows 45 illustrate a rolling flow pattern in chamber 21 which creates a flow path component at opening 28 away from clarifier chamber 22. Notice that inclined wall portion 26 extends fully across vessel 11 between side walls 14, 15 and from side wall 16 forwardly to edge 27. Thus, any solid material over the entire horizontal cross-section of clarifier 22 will be channeled back to flow opening 28.

Thus, the apparatus of the present invention is a paragon of simplicity, yet has been found to be highly efficient in the treatment of wastewater. Table 1 illustrates sampling requirements for a test involved with a prototype having a design flow of five hundred (500) gallons per day.

TABLE 1

| Sample Location | Sampling Requirements | | |
|---|---|---|---|
| | Raw Influent | Final Effluent | Aerator |
| Type of Sample | 24 hr. composite | 24 hr. composite | Grab |
| Frequency of Test | Daily | Daily | Once/day |
| DO mg/l | | X | X |
| BOD$_5$ mg/l | X | X | |
| Suspended Solids (SS), mg/l | X | X | X |
| Volatile Suspended Solids (VSS), % | X | X | X |
| Settleable Solids ml/30 min. | | | X |
| Temp. °C. | X | X | X |
| pH | X | X | X |

During the test, the test unit had a design flow of five hundred (500) gallons per day. The prototype unit for test purposes was made of fiberglass with a total volumetric capacity of approximately seven hundred sixty-eight (768) gallons. Air was delivered to the diffuser by a ⅛ horsepower diaphragm air pump at a rate of approximately 1.25 CFS, free air displacement. With regard to the location of influent and effluent sampling lines, the influent sampling point was immediately prior to the splitter box used to deliver the proper amount of influent flow. This box was immediately prior to the test plant influent pipe. The effluent sampling point was located approximately two feet from the effluent pipe. Those samples were collected directly into a two-inch PVC piper. A 24-hour timer with 15-minute interval control was utilized to operate the influent wastewater pump and the influent and effluent composite samplers (ISCO Model 1580 composite samplers were kept iced at all times). Flow-weighting of sampling was accomplished by simply setting the automatic samplers to collect a 200 ml sample once during each 15-minute interval that the influent pump was on. This was done automatically and lagged a few minutes behind the initial influent pump start-up to insure flow in both the influent and effluent lines. All samples were collected and analyzed on a five-work days per week basis. Table 1 indicates the sampling requirements. Waste loading regime consisted of two distinct phases. The first was the normal loading phase which ran for a minimum of six months. Listed below is a daily hydraulic loading rate for the normal loading period.

| 6 a.m.–9 a.m. | 35% of total daily flow |
|---|---|
| 11 a.m.–2 p.m. | 25% of total daily flow |
| 5 p.m.–8 p.m. | 40% of total daily flow |

These rates are equivalent to one hundred seventy-five (175) gallons, one hundred twenty-five (125) gallons and two hundred (200) gallons per day, respectively.

The second waste loading regime consisted of four stress test conditions which simulate (1) was day, (2) working mother, (3) equipment or power failure, and (4) family returning from a one week vacation. The actual plant loading conditions are illustrated in Appendix A of NSF Standard 40.

All standard evaluation period samples were collected and analyzed on a five consecutive day per week basis utilizing procedures specified in Standard Methods for the Examination of Water and Wastewater and the Manual of Methods for Chemical Analysis of Water and Wastes. Stress testing samples were collected immediately before and for seven days following each special dosing requirement. The plant was returned to the standard design loading during the seven days between each stressing sequence. During the testing period of approximately 293 days, there were days when scheduled samples were not collected due to equipment failure or plugging of the sampling lines. It is important to note that these conditions did not appear to have any adverse affects on the overall test treatment plant performance and evaluation.

During the total testing period of 293 days, the prototype apparatus as shown in the drawings of FIGS. 1-4, and with a 768 gallon capacity, produced a treated effluent quality which met or exceeded all NSF Standard No. 40, Class I requirements. This includes both the six-month normal testing period and stress testing. Table 2 summarizes the water quality data generated during the normal testing period. Values are reported as minimum, maximum, and mean, with units identified. Table 3 specifically lists the BOD and SS removal efficiencies as required by NSF Standard No. 40. the following sections include a brief discussion of selected parameters measured and their relationship to NSF Standard No. 40 requirements. Stress testing results are graphically presented in Appendix B.

TABLE 2

Summary of Performance Data

|  |  | Test Period | | |
| --- | --- | --- | --- | --- |
|  |  | Mean | Minimum | Maximum |
| Dissolved Oxygen (mg/1) | Aeration Chamber | 2.2 | 0.1 | 6.9 |
|  | Effluent | 2.0 | 0.1 | 6.7 |
| 5-Day Biochemical Oxygen Demand (mg/1) | Influent | 198.6 | 112.8 | 378.5 |
|  | Effluent | 19.3 | 1.5 | 91.4 |
| Suspended Solids (mg/1) | Influent | 169.9 | 42.0 | 672.0 |
|  | Aeration Chamber | 2,658.2 | 16.4 | 6,560.0 |
|  | Effluent | 13.6 | 0.7 | 63.0 |
| Volatile Suspended Solids (%) | Influent | 84 | 52 | 91 |
|  | Aeration Chamber | 66 | 41 | 91 |
|  | Effluent | 62 | 21 | 81 |
| pH | Influent | 7.7 | 7.0 | 8.2 |
|  | Aeration Chamber | 7.7 | 7.2 | 8.4 |
|  | Effluent | 7.6 | 7.2 | 8.2 |
| Temperature (°C.) | Influent | 29 | 22 | 30 |
|  | Aeration Chamber | 26 | 24 | 30 |
|  | Effluent | 26 | 22 | 30 |
| Settleable Solids (30 minute, ml/1) | Aeration Chamber | 525 | 50 | 950 |

TABLE 3

Summary of Removal Efficiencies

|  | 5-Day Biochemical Oxygen Demand (mg/1) | Suspended Solids (mg/1) |
| --- | --- | --- |
| Number of Observations | 166 | 173 |
| Influent Mean (mg/1) | 198.6 | 169.9 |
| Effluent Mean (mg/1) | 19.3 | 13.6 |
| Reduction (mg/1) | 179.3 | 156.3 |
| Percent Reduction | 90 | 92 |

NSF Standard No. 40 lists several effluent requirements to be met during the normal testing and stress testing period. Class I plant effluent quality must be shown to meet EPA Secondary Treatment Guidelines for $BOD_5$, SS and pH. These guidelines are as follows:
1. $BOD_5$ and suspended solids
   a. Arithmetic mean of all effluent samples collected in a period of 30 consecutive days ≦30 milligrams per liter and ≧85 percent removal.
   b. Arithmetic means of all effluent samples collected in a period of 7 consecutive days ≦45 milligrams per liter.
2. pH
   a. Effluent values shall remain between the limits of 6.0 and 9.0.

Additional requirements state that the effluent shall be tested three times during the six month testing period for color, odor, oily film and foam after diluting 1:1000 with distilled water with the following limitations:
1. Color—15 units
2. Threshold Odor—noneffensive
3. Oily Film—nonvisible evidence other than air bubbles
4. Foam—none For stress testing, composite samples collected for the period beginning 24 hours after completion of each stress test shall not exceed $BOD_5$ and SS values of 60 mg/1, and 100 mg/1, respectively. Additionally, mechanical component parts shall not produce noise in excess of 60 dbA when measured from a distance of 20 feet.

During both the six month normal testing period and the stress test conditions, the prototype apparatus produced a treated effluent which met all of the above-mentioned effluent quality requirements.

Five Day Biochemical Oxygen Demand ($BOD_5$): Influent $BOD_5$ values ranged from a minimum of 112.8 to a maximum of 378.5 mg/1, with the mean influent value calculated at 198.6 mg/1 for 116 observations. These values are generally in the expected range of concentrations for domestic wastewater. Effluent minimum, maximum and mean values were observed to be 1.5, 91.4 and 19.3 mg/1, respectively.

Concentrations of suspended solids in the influent flow averaged 169.9 mg/1 with minimum and maximum values being 42.0 and 672.0 mg/1, respectively. Mixed liquor suspended solids values averaged 2658 mg/1; a typical level for an extended aeration treatment plan. Effluent suspended solids averaged 13.6 mg/1 for 173 observations.

Measurements of pH levels illustrated very little variation throughout the study period, with all observations being within standards of 6.0 to 9.0 units.

Effluent samples were tested three times during the standard evaluation period for color, odor, oily film and foam. Each sample was diluted 1:1000 with distilled water as called for by NSF Standard 40. The results are listed hereafter:

| Date | Color | Threshold Odor |
| --- | --- | --- |
| 12-03-85 | 1 unit | Nonoffensive |
| 02-12-86 | 1 unit | Nonoffensive |
| 04-15-86 | 1 unit | Nonoffensive |

| Oily Film | Film |
| --- | --- |
| None | None |
| None | None |
| None | None |

Noise: The noise level of the mechanical component parts of the tested plant was measured with a Bruel and Kjaer Precision Integrating Sound Level Meter, Type 2218 at a distance of 20 feet. The noise level was measured at 22 dbA.

Inspection of the prototype apparatus prior to startup and during the testing period indicated that the tested prototype apparatus met or exceeded all NSF Standard 40 regulations regarding materials, design and construction.

The foregoing description of the invention is illustrative and explanatory thereof, and various changes in the size, shape and materials, as well as in the details of the illustrated construction may be made without departing from the spirit of the invention.

We claim:

1. A self-contained wastewater treatment system, comprising:
   a. sealed vessel means having a bottom, side walls, a longitudinal axis generally parallel to the side walls and bottom, and a lid defining a hollow interior for containing wastewater underground and wherein flow during use proceeds generally longitudinally in the vessel;
   b. a vessel influent line positioned at the upper portion of the vessel means for transmitting a wastewater stream to the vessel means;
   c. an effluent line for discharging fluid from the vessel means positioned at the top portion of the vessel means and generally opposite the vessel means influent which draws effluent water from below the surface so that floating matter is not discharge via the effluent line the effluent defining an operating water surface elevation at the upper portion of the vessel means and comprising a pair of sequentially connected angular turns of pipe defining an outlet flow bore that substantially change the direction of flow being discharged from the vessel means at least twice, defining an outlet flow bore including one angular turn of pipe for changing the direction of flow from the longitudinal flow direction in the vessel to a second flow direction generally transverse to the longitudinal flow direction and within the effluent pipe and a second angular turn of pipe for changing the direction of the flow of fluid from the second generally transverse direction to a third direction generally at right angles to the second transverse direction;
   d. a baffle wall positioned within the interior and generally between the influent line and effluent line extending transversely to the left and right side walls, the baffle extending upwardly to the lid and above the operating water surface elevation and downwardly approaching but not sealing against the bottom so that fluid can flow under the baffle wall defining a baffle under flow zone, the baffle wall dividing the vessel into two chambers including an upsteam aeration chamber and a downstream clarifier chamber;
   e. the side walls including a downstream end wall transverse to the general direction of flow between the influent line and effluent line, a lower portion of the downstream end wall having an incline that intersects the bottom at a position adjacent the lower edge of the baffle so that settleable solids which hit the incline can slide downwardly to the baffle underflow zone; and
   f. means for producing aeration within the aeration chamber, the aeration means being positioned to produce a generally circular fluid flow path within the aeration chamber that has a flow path component adjacent the lower end of the baffle with a flow direction generally away from the clarifier chamber.

2. The apparatus of claim 1 wherein the baffle wall has a pair of side edges continuously connected to the left and right side walls.

3. The apparatus of claim 1 wherein the inclined section forms an acute angle with horizontal.

4. The apparatus of claim 1 wherein the inclined section forms an angle of greater than 45° with horizontal.

* * * * *